United States Patent [19]

Haikawa et al.

[11] Patent Number: 5,781,604
[45] Date of Patent: Jul. 14, 1998

[54] INITIAL CORE AND FUEL ASSEMBLY

[75] Inventors: Katsumasa Haikawa, Jyuou-machi; Akihiro Yamanaka; Akiko Kanda, both of Hitachi; Motoo Aoyama, Mito; Yoko Yuchi; Junichi Yamashita, both of Hitachi, all of Japan

[73] Assignee: Hitachi, Ltd., Tokyo, Japan

[21] Appl. No.: 727,008

[22] Filed: Oct. 8, 1996

[30] Foreign Application Priority Data

Oct. 11, 1995 [JP] Japan .................................... 7-262940

[51] Int. Cl.$^6$ .................................. G21C 3/00; G21C 3/328
[52] U.S. Cl. ........................... 376/419; 376/428; 376/435
[58] Field of Search ............................ 376/419, 428, 376/435, 444

[56] References Cited

U.S. PATENT DOCUMENTS

| | | | |
|---|---|---|---|
| 5,176,877 | 1/1993 | Nakajima et al. | 376/435 |
| 5,249,211 | 9/1993 | Nagano et al. | 376/435 |
| 5,337,337 | 8/1994 | Aoyama et al. | 376/435 |
| 5,377,247 | 12/1994 | Yoshioka et al. | 376/428 |
| 5,388,132 | 2/1995 | Aoyama e al. | 376/435 |
| 5,432,829 | 7/1995 | Aoyama et al. | 376/435 X |

FOREIGN PATENT DOCUMENTS

| | | |
|---|---|---|
| 0473334 | 3/1992 | European Pat. Off. |
| 02-232595 | 9/1990 | Japan . |
| 04-050795 | 2/1992 | Japan . |
| 04-109193 | 4/1992 | Japan . |
| 04-122888 | 4/1992 | Japan . |
| 04-238292 | 8/1992 | Japan . |
| 05-249270 | 9/1993 | Japan . |
| 06-281769 | 10/1994 | Japan . |
| 07-234295 | 9/1995 | Japan . |

*Primary Examiner*—Michael J. Carone
*Assistant Examiner*—Matthew J. Lattig
*Attorney, Agent, or Firm*—Antonelli, Terry, Stout, & Kraus, LLP

[57] ABSTRACT

In an initial core of the present invention, a low enrichment fuel assembly having the lowest average enrichment factor and three fuel assemblies having a higher average enrichment factor than that of the low enrichment fuel assembly are arranged in a square shape, control rods of a cross shape are arranged at each of four corners of the square shape to constitute a unit loading pattern, and a plurality of the unit loading patterns are provided in the central region of the core, the fuel assemblies having the higher average enrichment factor are divided by a diagonal line into a first region of the side of the control rods and a second region of the side opposite to the control rods, and the number of the gadolinia-containing fuel rods is greater in the second region by at least two than in the first region.

The initial core having an enhanced average enrichment factor for accomplishing a high exposure, makes it possible to maintain thermal margin, to suitably suppress the excess reactivity and to improve fuel economy.

11 Claims, 19 Drawing Sheets

5,781,604

1

INITIAL CORE AND FUEL ASSEMBLY

BACKGROUND OF THE INVENTION

The present invention relates to an initial core and fuel assemblies for a boiling-water reactor (hereinafter abbreviated as BWR).

A reactor continues to produce energy based upon a chain reaction in which neutrons are absorbed by a fissionable material causing fission, and neutrons emitted together with energy cause another fission. When a chain reaction is in equilibrium, the reactor is in critical state, in which it continues producing constant power. A state in which a chain reaction continues to increase is supercritical, whereas a state in which a chain reaction continues to decrease is subcritical.

The reactor must continue to operate for a predetermined period of time without replenishing the fuel and, hence, the fissionable material is loaded in the core in an amount larger than the amount necessary for maintaining the critical state. Without the control material, therefore, the reactor becomes supercritical. The excess of reactivity is called excess reactivity. It is important to suitably control the excess reactivity throughout the operation period. A known technology for controlling the excess reactivity throughout the operation period consists of mixing a burnable poison into the fuel. The burnable poison is a neutron-absorbing material which gradually burns throughout the operation period and loses its mass. A known example may be gadolinia that is mixed into the nuclear fuel material.

Next, described below with reference to a drawing is a state for suppressing the reactivity by the burnable poison. FIG. 22 illustrates changes in the infinite multiplication factor of fuel assemblies in which is mixed gadolinia which is a burnable poison depending upon the exposure. In general, the infinite multiplication factor decreases during the initial stage of burning with an increase in the number of fuel rods in which is mixed the burnable poison. Furthermore, the period in which gadolinia burns out can be delayed with an increase in the concentration of the burnable poison that is mixed and, as a result, a maximum infinite multiplication factor can be suppressed. Therefore, excess reactivity can be properly controlled depending upon the combination of a concentration of the burnable poison and the number of fuel rods in which the burnable poison is mixed.

Next, fuel economy of the initial core of the reactor will be described. In the initial core, some of the loaded fuel assemblies are taken out after the operation of a first cycle and are replaced by new reload fuel assemblies. The fuel assemblies taken out after the first cycle have an exposure smaller than that of other fuel assemblies and produce less energy. In order to effectively utilize the fissionable material, therefore, there has been proposed an initial core using a plurality of fuel assemblies by changing the uranium enrichment factor depending upon the period in which the fuel assemblies stay in the reactor.

As a conventional initial core, Japanese Patent Laid-Open No. 249270/1993 discloses a core constituted by high enrichment fuel assemblies (hereinafter referred to as high enrichment fuel) having an average enrichment factor of 3.4%, middle enrichment fuel assemblies (hereinafter referred to as middle enrichment fuel) having an average enrichment factor of 2.3%, and low enrichment fuel assemblies (hereinafter referred to as low enrichment fuel) having an average enrichment factor of 1.1%. There has further been described that in order to effectively utilize the fissionable material, the fuel assemblies having low enrichment factors are taken out from the core in an early time and fuel assemblies having high enrichment factors are loaded in the core for extended periods of time.

In order to further enhance the discharge exposure of the initial core, it is necessary to lengthen the period in which the fuel assemblies stay in the furnace by further increasing the average enrichment factor of the core. Therefore, when the initial core is constituted by combining many kinds of fuel assemblies having different average enrichment factors as described above, a difference in the enrichment factor increases among the fuel assemblies and a difference in the nuclear characteristics increases between the high enrichment fuel and the low enrichment fuel. When the fuel assemblies having a large difference in the nuclear characteristics are adjacent to each other, there takes place exchange of neutrons since the fuel assemblies have different neutron spectra. In the initial stage of burning, therefore, the minimum critical power ratio and the maximum linear power heat generation ratio raise the necessity to improve the thermal margin.

From the standpoint of improving the thermal margin, so far, the fuel rods containing gadolinia (hereinafter referred to as gadolinia rods) have been arranged as symmetrically as possible on the lateral cross section of the fuel assemblies. The number of the gadolinia rods is determined from the standpoint of properly controlling the excess reactivity of the core as described earlier and does not necessarily become multiples of 2 or 4. Therefore, the gadolinia rods are not necessarily arranged completely symmetrically in the lattice of the fuel assemblies. FIG. 23 illustrates a conventional arrangement of gadolinia rods in the fuel assembly. In this case, among 9×9 (9 rows and 9 columns) fuel rods arranged in the form of a square lattice with thirteen gadolinia rods 12 which are symmetrically arranged as much as possible along the four sides of the square, though complete symmetrical arrangement is not realized.

When the average enrichment factor of the core is increased to accomplish a high exposure in the initial core, the excess reactivity increases so that the control rods must be inserted in an increased number in the core. Therefore, the channel peaking factor increases and the thermal margin decreases. Moreover, the thermal margin decreases depending upon a difference in the nuclear characteristics among the fuel assemblies.

SUMMARY OF THE INVENTION

The object of the present invention is to provide an initial core and fuel assembly for use therein, the initial core having an enhanced average enrichment factor for accomplishing a high exposure, and capable of suitably suppressing the excess reactivity yet maintaining a thermal margin and capable of enhancing fuel economy.

In order to accomplish the above-mentioned object, an initial core of the present invention comprises a plurality of fuel assemblies having a substantially square outer shape and different average enrichment factors, and a plurality of cross-shaped control rods, wherein a low enrichment fuel assembly having the lowest average enrichment factor and three fuel assemblies having a higher average enrichment factor than that of the low enrichment fuel assembly are arranged in a square shape, said control rods are arranged at each of four corners of said square shape to constitute a unit loading pattern, a plurality of said unit loading patterns are provided in the central region of the core, the fuel assemblies having the higher average enrichment factor are divided by a diagonal line into a first region of the side of the control rods and a second region of the side opposite to the control rods, and the number of the gadolinia-containing fuel rods is greater in the second region by at least two than in the first region.

Further a fuel assembly of the present invention comprises a plurality of fuel rods arranged in the form of a square lattice, an upper tie plate and a lower tie plate for supporting said plurality of fuel rods at the upper and lower portions, and a channel fastener attached to a corner portion of the upper tie plate, wherein the fuel assembly is divided by a diagonal line into a first region of the side of the channel fasteners and a second region of the side opposite to the channel fasteners, and the number of the gadolinia-containing fuel rods is greater in the the second region by at least two than in the first region.

According to the present invention, a plurality of unit loading patterns are provided in the central region of the core, and thus the loading patterns can be nearly uniform in the central region to decrease the channel peaking factor. In this case, the core can be very simply constituted since the central region is constituted by one kind of unit loading patterns.

In order to make sure the effect for decreasing the channel peaking according to the present invention, FIG. 5 shows a change in the channel peaking factor depending upon the exposure in the initial core according to the present invention shown in FIG. 1 that will be described later in comparison with that of the initial core (prior art) disclosed in Japanese Patent Laid-Open No. 249270/1993. It will be understood from FIG. 5 that the present invention makes it possible to greatly decrease the channel peaking factor and to increase the thermal margin compared with those of the prior art.

From the standpoint of thermal margin, the fuel assemblies located at a high power portion of the core have a severe thermal margin in the initial core. As shown in a comparative example of FIG. 6, when a low enrichment fuel 8 and a high enrichment fuel 9a are adjacent to each other, the neutrons migrate between these fuels. Therefore, among the fuel rods in the high enrichment fuel 9a, the fuel rods along the outermost circumference adjacent to the low enrichment fuel 8 produce a high fuel rod power as shown in FIG. 7 due to the flow of a flux of thermal neutrons from the low enrichment fuel 8.

According to the present invention as shown in FIG. 2A that will be described later, on the other hand, the gadolinia rods 12 are arranged in a concentrated manner in the high enrichment fuel 9 on the side opposite to the control rods and, hence, the power is suppressed on the side opposite to the control rods. That is, among the fuel rods in the high enrichment fuel 9, the power of the fuel rods along the outermost circumference adjacent to the low enrichment fuel 8 can be lowered. Even in this case, the fuel rods produce an increased power due to the flow of a flux of thermal neutrons from the low enrichment fuel 8. Over the whole fuel assembly, however, the output of the fuel rods can be flattened compared with that of comparative example of FIG. 6. FIG. 8 shows the flattened state. The flattened power of the fuel rods contributes to increasing the thermal margin.

FIG. 9 is a diagram illustrating a relationship between a maximum fuel rod power and a difference in the number of the gadolinia rods between the region of the side opposite to the control rods and the region of the side of the control rods while changing the positions of the gadolinia rods, and wherein the abscissa represents a difference $n_1-n_2$ between the number $n_1$ of the gadolinia rods in the region of the side opposite to the control rods and the number $n_2$ of the gadolinia rods in the region of the side of the control rods (hereinafter referred to as a difference of Gd rod number) and the ordinate represents a maximum fuel rod power. Here, as shown in FIG. 10, when the fuel assembly is divided into two regions by a diagonal line 19, the region close to the control rods 7 is called a region 13 of the side of the control rods and a region away from the control rods 7 is called a region 14 of the side opposite to the control rods. When there is a gadolinia rod on which the diagonal line 19 is passing, 0.5 is added to the number of gadolinia rods both in the region on the side of the control rods and in the region on the side opposite to the control rods. The value of the ordinate of FIG. 9 is standardized by a maximum value of the fuel rod power of the fuel assembly shown in FIG. 10. For example, a point A and a point B of FIG. 9 correspond to maximum values of the fuel rod power of the fuel assembly shown in FIGS. 11 and 12.

It will be understood from FIG. 9 that a maximum fuel rod power can be effectively decreased by setting the difference of Gd rod number to be two or more. From FIG. 9, as the difference of Gd rod number becomes not smaller than two, the maximum fuel rod power decreases at a small rate. In order to effectively decrease the fuel rod power, therefore, it is desired that a difference of Gd rod number is set to be not smaller than 3 at which the rate of reduction tends to saturate. The fuel assembly has a channel fastener at a corner on the side of the control rods to fasten the fuel assembly to the control rods. Therefore, the region on the side of the control rods corresponds to the region of the side of the channel fastener.

FIG. 9 does not show the upper limit of the difference in the number of the gadolinia rods. However, there is an upper limit in the difference of Gd rod number, which is about onefourth of the total number of the fuel rods in the fuel assembly. This is because, the gadolinia rods are arranged at positions except the outermost circumference of the fuel assembly, and it is not allowed to arrange the gadolinia rods in a number larger than that of the fuel assembly shown in FIG. 13 on the region 14 of the side opposite to the control rods. In the case of FIG. 13, the difference of Gd rod number is 19 which is about one fourth of 74 which is the total number of the fuel rods.

Next, described below is the excess reactivity. Upon arranging the gadolinia rods in a concentrated manner on the region of the fuel assembly of the side opposite to the control rods, the peripheries of the gadolinia rods become rich in gadolinia which strongly absorbs thermal neutrons and, hence, the flux of thermal neutrons becomes weak. Therefore, the burning of gadolinia is delayed to obtain the same effect as when the gadolinia concentration is increased. FIG. 14 illustrates a change in the infinite multiplication factor depending upon the exposure of the fuel assembly in which the gadolinia rods are uniformly arranged according to the prior art in comparison with that of the fuel assembly in which the gadolinia rods are arranged in a concentrated manner on the region of the side opposite to the control rods according to the present invention. According to the present invention as shown in FIG. 14, the burning of gadolinia is delayed, and the infinite multiplication factor is suppressed to be smaller than that of the prior art at a moment after the burning of the fuel assembly has proceeded. Therefore, the excess reactivity is suppressed despite the average enrichment factor of the fuel has increased, making it possible to accomplish a high degree of exposure.

According to the present invention as described above, the excess reactivity can be suitably suppressed while maintaining a thermal margin. It is therefore allowed to increase the average enrichment factor of the fuel and to realize an initial core that features high fuel economy.

BRIEF DESCRIPTION OF THE DRAWINGS

FIG. 2A is a lateral sectional view of a unit loading pattern according to the first embodiment of the present invention and FIG. 2B is an enlarged lateral sectional view of a high enrichment fuel assembly of FIG. 2A having fuel rods arranged in accordance with FIG. 3;

DETAILED DESCRIPTION OF THE PREFERRED EMBODIMENTS

Embodiments of the invention will now be described with reference to the drawings.

Figure 1:
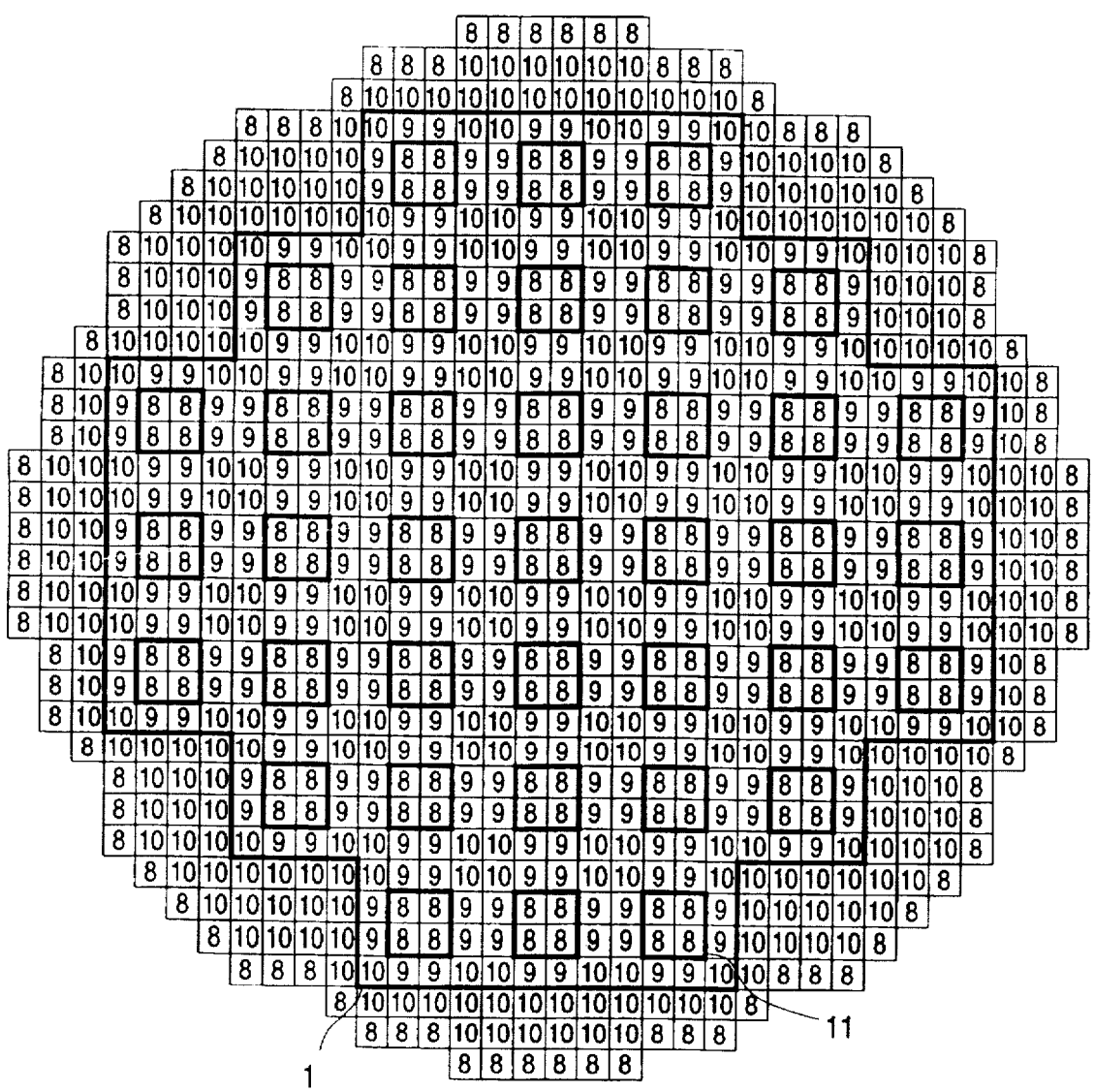
FIG. 1 is a lateral sectional view of an initial core according to a first embodiment of the present invention.

FIG. 1 is a lateral sectional view of an initial core according to a first embodiment of the present invention. This core contains a total of 872 fuel assemblies comprising 240 low enrichment fuels 8, 296 high enrichment fuels 9, and 336 high enrichment fuels 10. Here, the high enrichment fuels 9 and 10 have gadolinia rods that are arranged in the fuel assemblies in different ways.

Figure 2A:
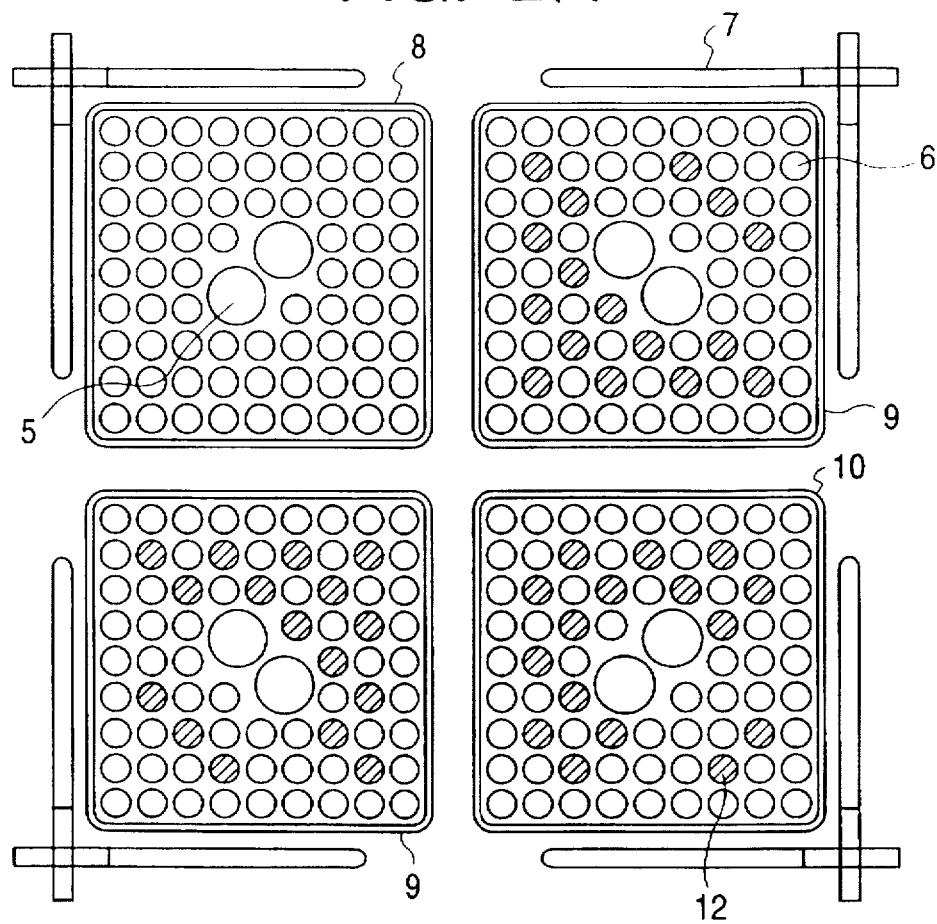

A unit loading pattern shown in FIG. 2A is arranged in the high power region 1 producing high power at the central portion in the core. FIG. 2 is a lateral sectional view of the unit loading pattern according to the first embodiment of the present invention. The unit loading pattern comprises a low enrichment fuel 8, two high enrichment fuels 9 and a high enrichment fuel 10, the fuel assemblies being surrounded by four cross-shaped control rods 7. In the fuel assemblies constituting the unit loading pattern, the fuel rods 6 are arranged in a number of 9 by 9 in the form of a square lattice (having a substantially square outer shape), and in the central portion thereof are arranged two water rods 5 of a large diameter through which the water flows. Here, the two water rods 5 are arranged in a region where seven fuel rods can be arranged.

In the high power region 1, the four unit loading patterns are so arranged that the low enrichment fuels 8 are adjacent to each other to constitute a control cell 11. That is, the four unit loading patterns are symmetrically arranged with respect to the center of the control cell 11. In the case of FIG. 1, there are constituted 37 control cells 11. In operating the reactor, the control cells 11 work to suppress the excess reactivity in the whole core by inserting the control rods 7 in the core. In the core of FIG. 1, the loading patterns of the fuel assemblies are all uniform in the high power region 1, making it possible to decrease the channel peaking in the core. This makes it possible to increase the thermal margin.

The number of the gadolinia rods 12 is sixteen in the high enrichment fuel 9 constituting the unit loading pattern of FIG. 2B; i.e., five gadolinia rods are arranged in the region of the side of the control rods and eleven gadolinia rods are arranged in the region opposite to the control rods, the difference in the number of the rods being six. On the other hand, sixteen gadolinia rods 12 are arranged in the high enrichment fuel 10; i.e., six gadolinia rods are arranged in the region of the side of the control rods and ten gadolinia rods are arranged in the region of the side opposite to the control rods, the difference in the number of the rods being four. Thus, many gadolinia rods are arranged in the region of the side opposite to the control rods in the high enrichment fuel that constitutes the unit loading pattern, in order to flatten the power of the fuel rods in the unit loading pattern. This effect is obtained by selecting the number of the gadolinia rods in the region of the side opposite to the control rods greater by at least two than in the region of the side of the control rods. The effect becomes more conspicuous when the difference in the number of gadolinia rods is four or more as in this embodiment. This also contributes to increasing the thermal margin.

With many gadolinia rods arranged in the region of the side opposite to the control rods, it is allowed to delay the burning of gadolinia as described above and, hence, to suppress the infinite multiplication factor despite the burning proceeds. Therefore, the excess reactivity is suppressed despite of an increase in the average enrichment factor of the fuel, and a high burn-up is accomplished and fuel economy is enhanced, too.

Figure 4:
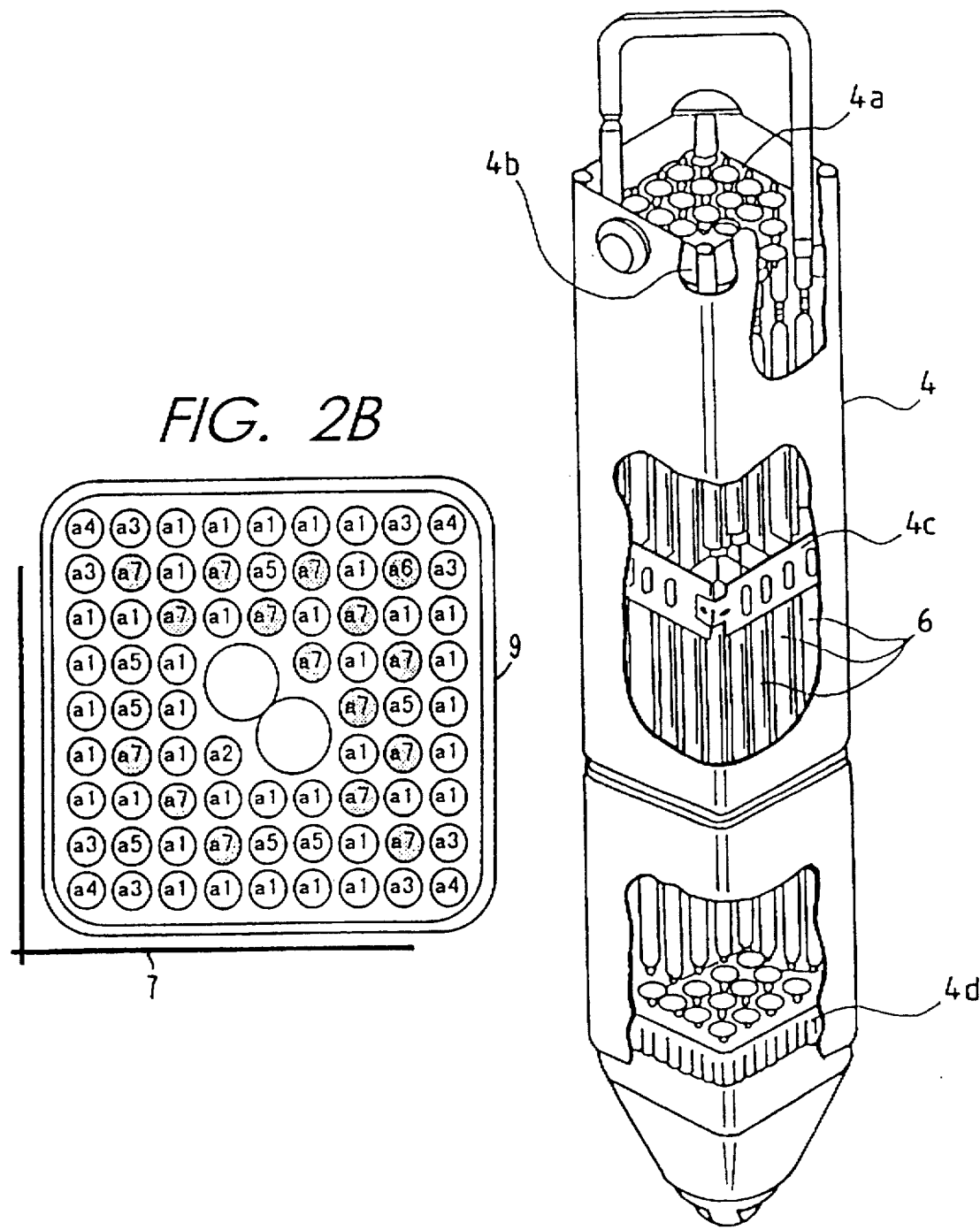
FIG. 4 is a partly cut-away perspective view of the fuel assembly according to the present invention.
Figure 5:
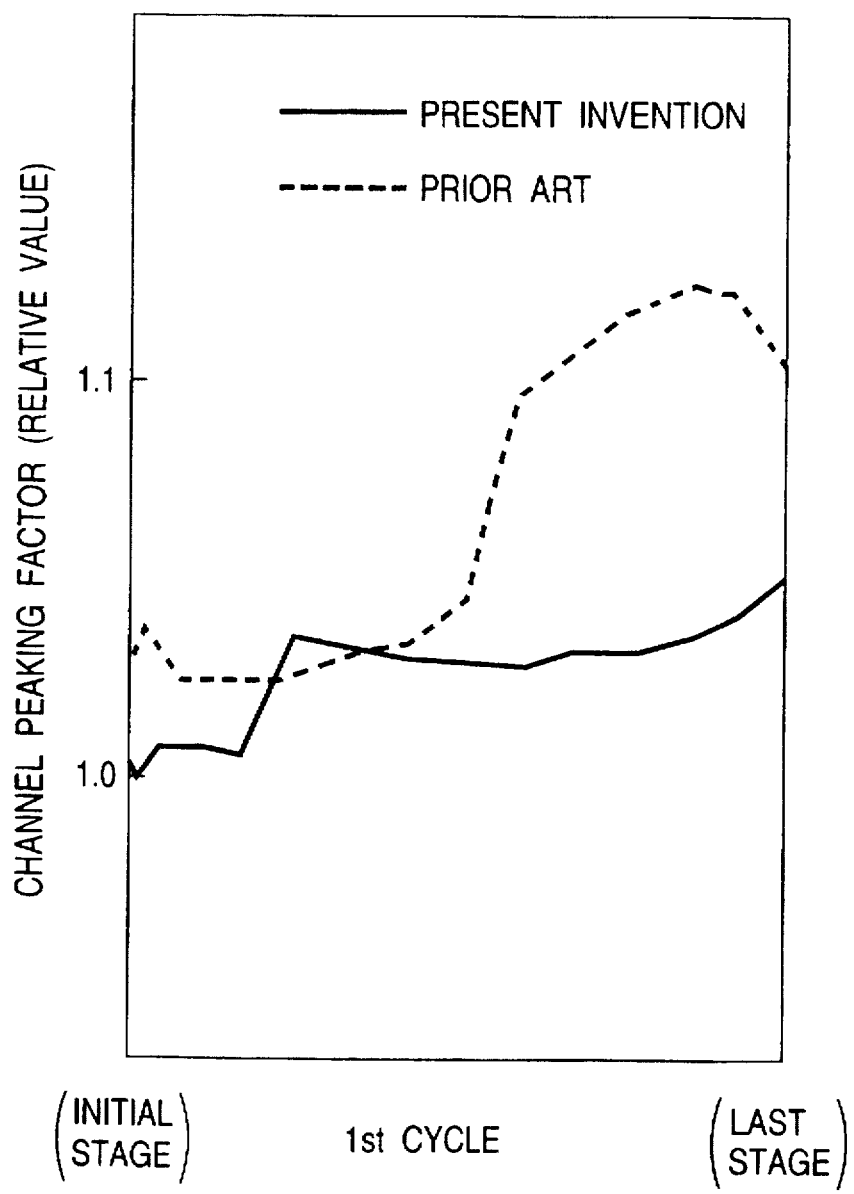
FIG. 5 is a diagram illustrating the effect for decreasing the channel peaking factor according to the present invention.
Figure 6:
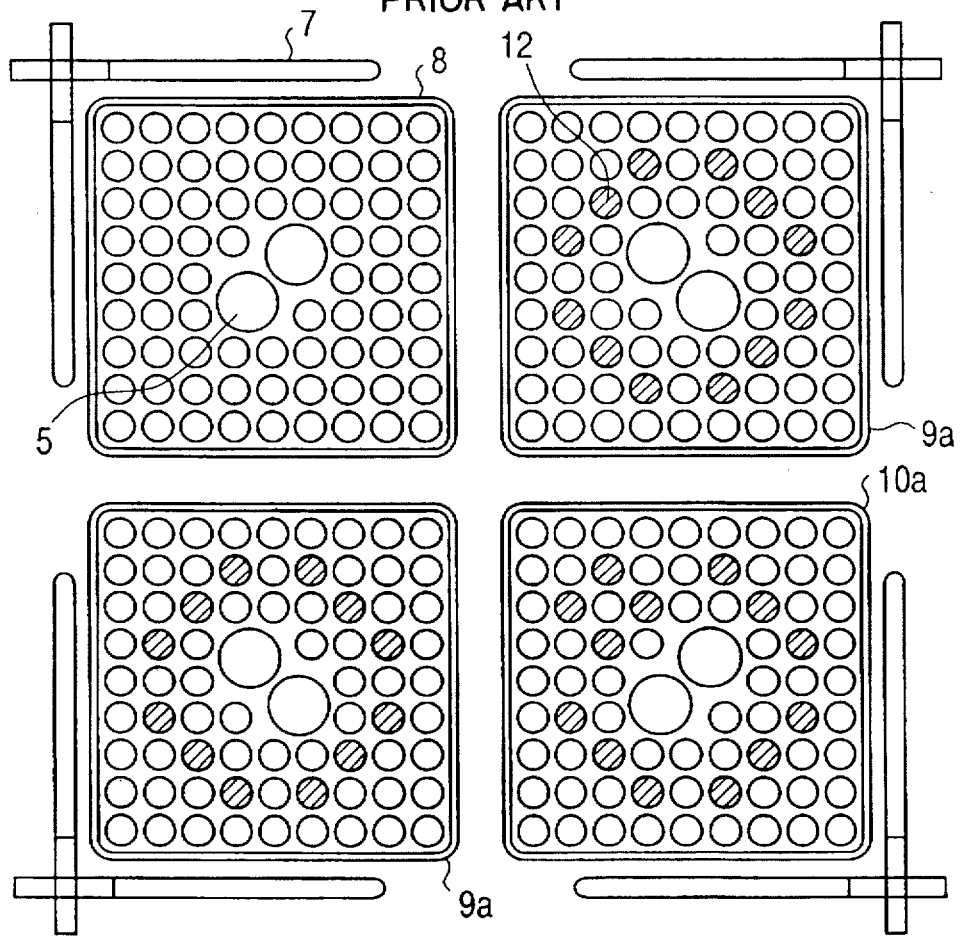
FIG. 6 is a diagram of a comparative example according to the present invention.

As shown in a partly cut-away perspective view of FIG. 4, a fuel assembly comprises an upper tie plate 4a, a lower tie plate 4d, channel fasteners 4b, a spacer 4c, water rods 5 (not shown), fuel rods 6, a channel box 4, and the like. Among them, the channel fastener 4b attached to a corner of the upper tie plate 4a works to fasten the fuel assembly to the control rod. When considered as a fuel assembly, therefore, the region of the side of the control rods corresponds to the region of the side where the channel fastener exists.

Figure 3:
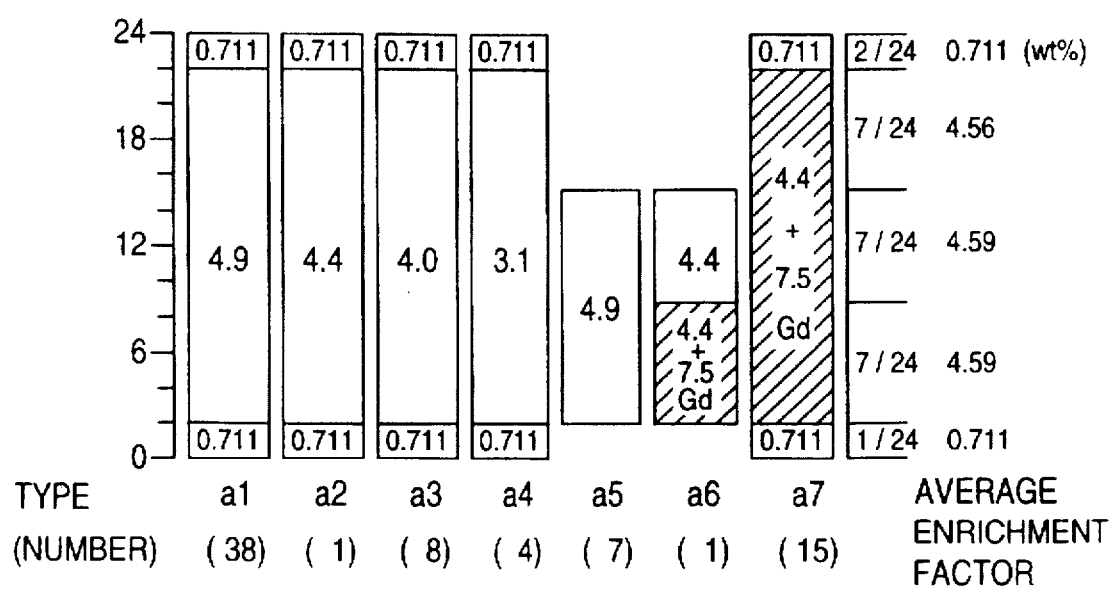
FIG. 3 is a diagram illustrating the distribution of the enrichment factor and gadolinia in the axial direction of a high enrichment fuel assembly of FIG. 2B.

FIG. 3 illustrates the enrichment factor in the axial direction of the high enrichment fuel 9 of FIG. 2B and the distribution of gadolinia. The high enrichment fuel 9 comprises fuel rods a1 to a4 that contain uranium fuel over the full effective length of the fuel but do not contain gadolinia, a fuel rod a5 that contains uranium fuel over a range of from $1/24$ to $15/24$ only from the bottom of the effective length of the fuel but does not contain gadolinia (hereinafter referred to as short fuel rod), a fuel rod a6 that contains uranium fuel over a range of from $1/24$ to $15/24$ only from the bottom of the effective length of the fuel and contains gadolinia over a range of from $1/24$ to $8/24$ from the bottom of the effective length of the fuel, and a fuel rod a7 that contains uranium fuel over the full effective length of the fuel and contains gadolinia over a range of from $1/24$ to $22/24$ from the bottom of the effective length of the fuel, the numbers of the fuel rods being as shown in FIG. 3.

The fuel rods a1 to a4 and a7 are loaded with natural uranium (enrichment factor of 0.711 wt % (% by weight)) in a lower region of from the lower end to $1/24$ of the effective length of the fuel and in an upper region of from the upper end down to $2/24$ of the effective length of the fuel. The fuel rod a7 is loaded with 4.4 wt % of uranium fuel and 7.5 wt % of gadolinia over a range of from $1/24$ to $22/24$ from the bottom of the effective length of the fuel. The fuel rod a6 is loaded with 4.4 wt % of uranium fuel and 7.5 wt % of gadolinia over a range of from $1/24$ to $8/24$ from the bottom of the effective length of the fuel, and with 4.4 wt % of uranium fuel over a range of from $8/24$ to $15/24$ from the bottom of the effective length of the fuel. The fuel rod a6 is provided at a corner of the second layer in the fuel assembly from the outside on the side opposite to the control rods. The fuel rod a5 is loaded with 4.9 wt % of uranium fuel only over the full length of the partly long fuel rod.

Based upon the combination of fuel rods shown in FIG. 3, the high enrichment fuel 9 is so constituted as to possess an average enrichment factor of 4.59 wt % on a cross section perpendicular to the axial direction over a region of from $1/24$ to $15/24$ from the bottom of the effective length of the fuel and an average enrichment factor of 4.56 wt % on a cross section perpendicular to the axial direction over a region of from $15/24$ to $22/24$ from the bottom of the effective length of the fuel.

On the other hand, the low enrichment fuel 8 of FIG. 2 does not contain gadolinia, but possess average enrichment factors of 1.49, 1.64 and 1.75 wt %, respectively, on the cross sections perpendicular to the axial direction in the regions of from $1/24$ to $8/24$, from $8/24$ to $15/24$, and from $15/24$ to $22/24$ from the bottom of the effective length of the fuel. Natural uranium is loaded in the lower region and in the upper region of the effective length of fuel like the high enrichment fuel 9.

Figure 15:
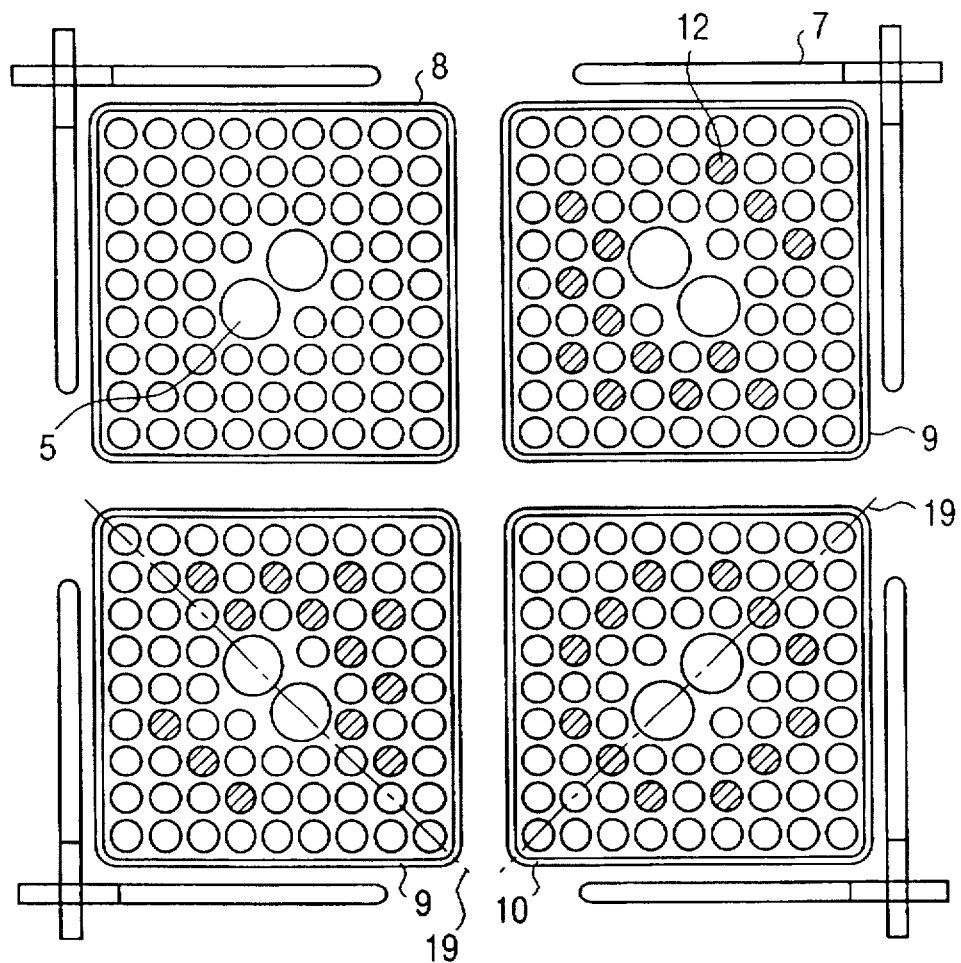
FIG. 15 is a lateral sectional view of a unit loading pattern according to a second embodiment of the present invention.

Next, described below with reference to FIG. 15 is a unit loading pattern according to a second embodiment of the present invention. FIG. 15 is a lateral sectional view of the second embodiment. There are thirteen gadolinia rods 12 in the high enrichment fuel 9 that constitutes the unit loading pattern; i.e., three gadolinia rods are arranged in the region of the side of the control rods and ten gadolinia rods are arranged in the region of the side opposite to the control rods, the difference of Gd rod number being seven. On the other hand, there are twelve gadolinia rods 12 in the high enrichment fuel 10; i.e.; six gadolinia rods are arranged in the region of the side of the control rods and six gadolinia rods are arranged in the region of the side opposite to the control rods, the difference in the number of the rods being zero.

Figure 7:
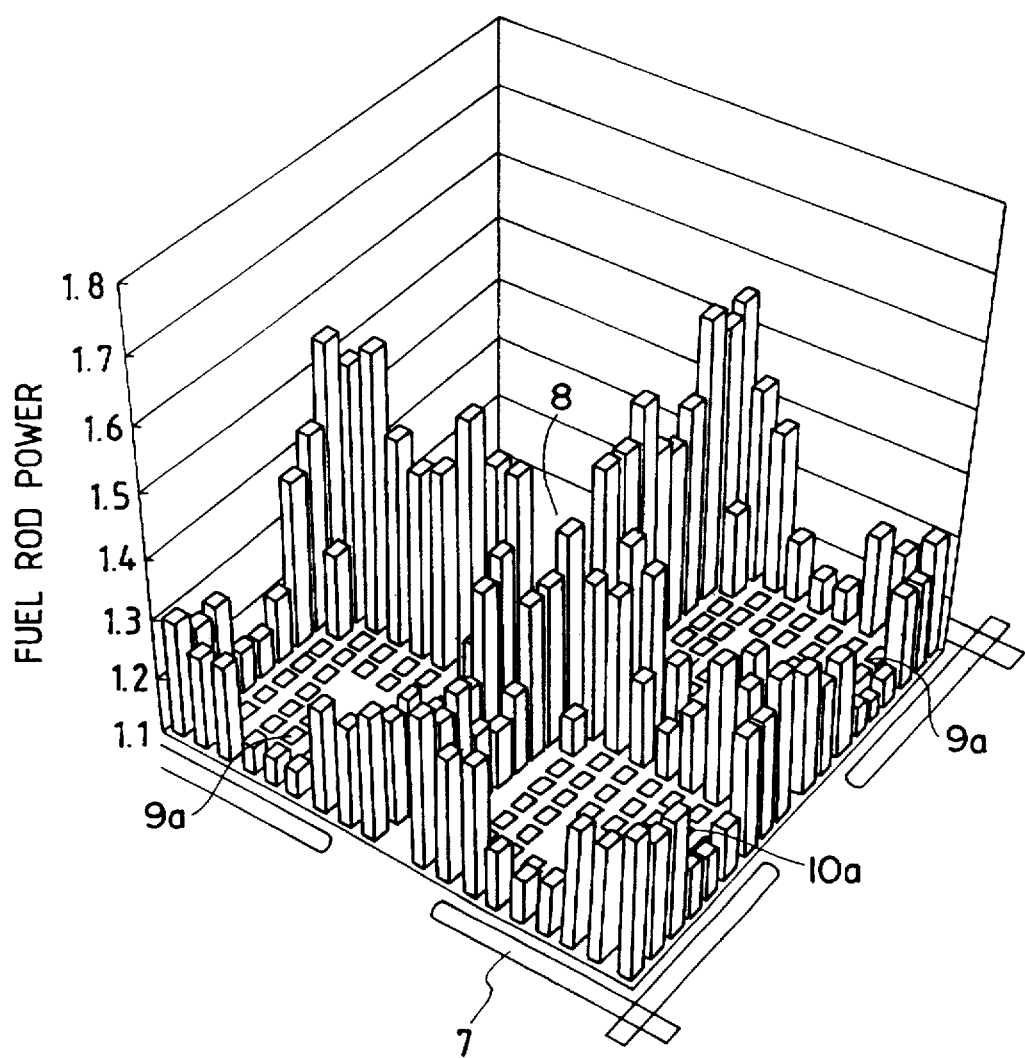
FIG. 7 is a diagram illustrating the distribution of the fuel rod power according to the comparative example of FIG. 6.
Figure 8:
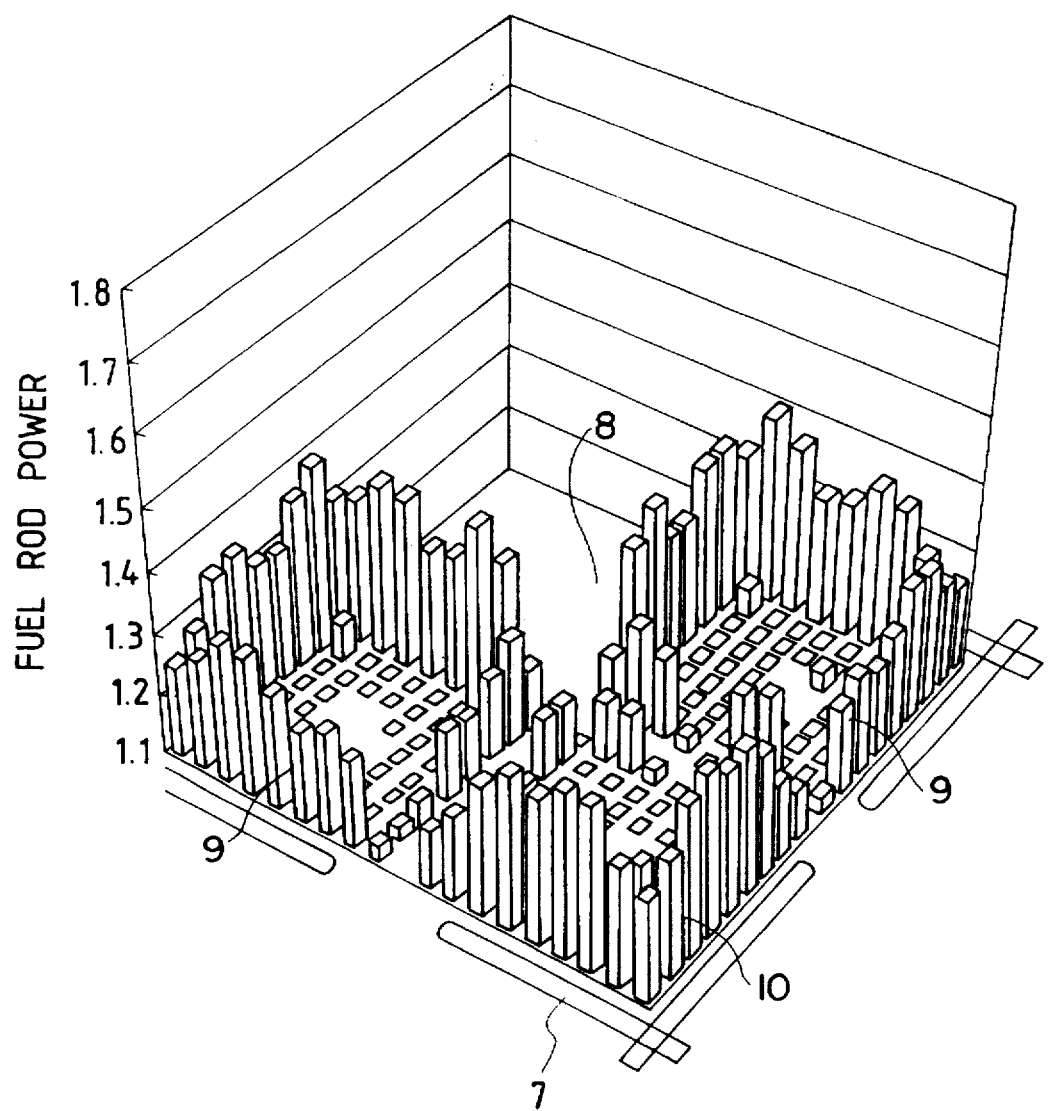
FIG. 8 is a diagram illustrating the distribution of the fuel rod power according to the present invention.
Figure 9:
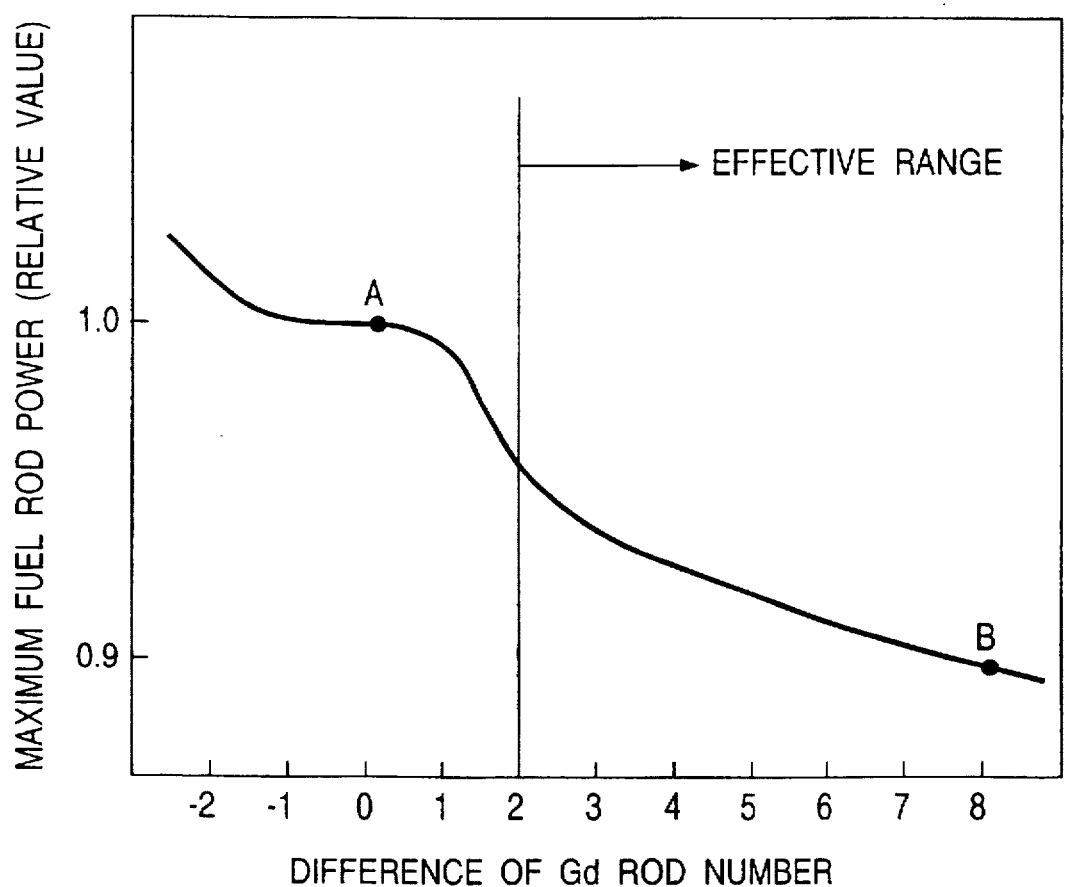
FIG. 9 is a diagram illustrating a relationship between a maximum fuel rod power and a difference of Gd rod number between the region of the side opposite to the control rods and the region of the side of the control rods.
Figure 10:
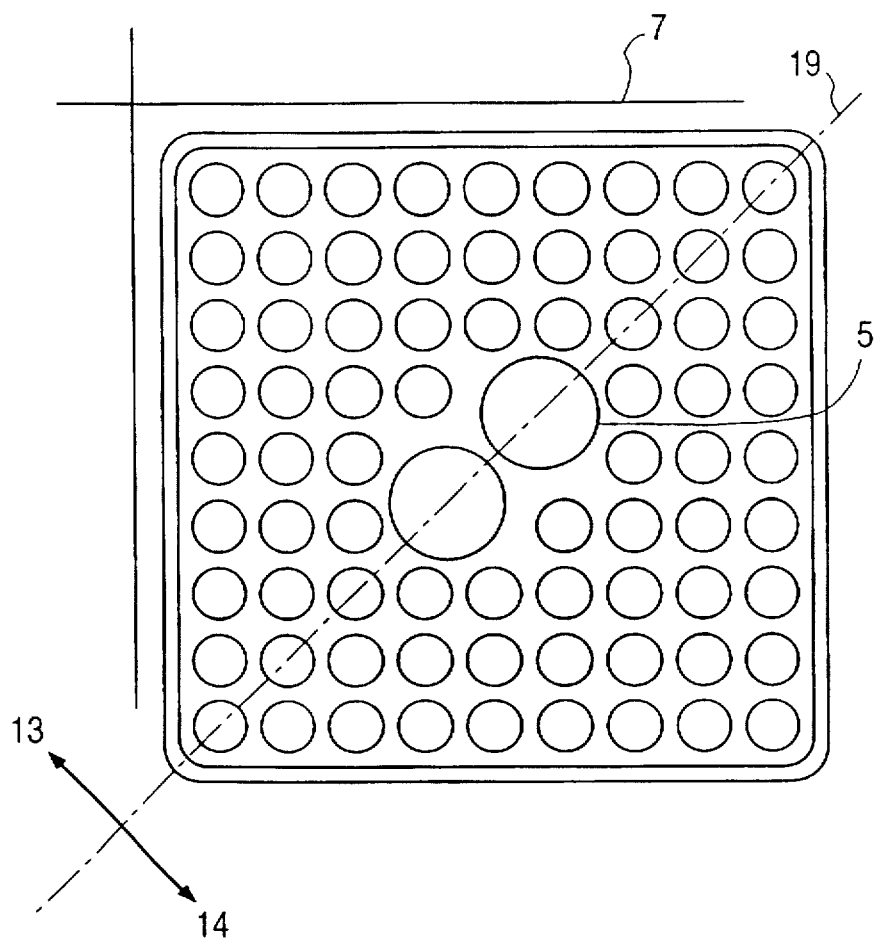
FIG. 10 is a diagram illustrating the region on the side opposite to the control rods and the region on the side of the control rods.
Figure 11:
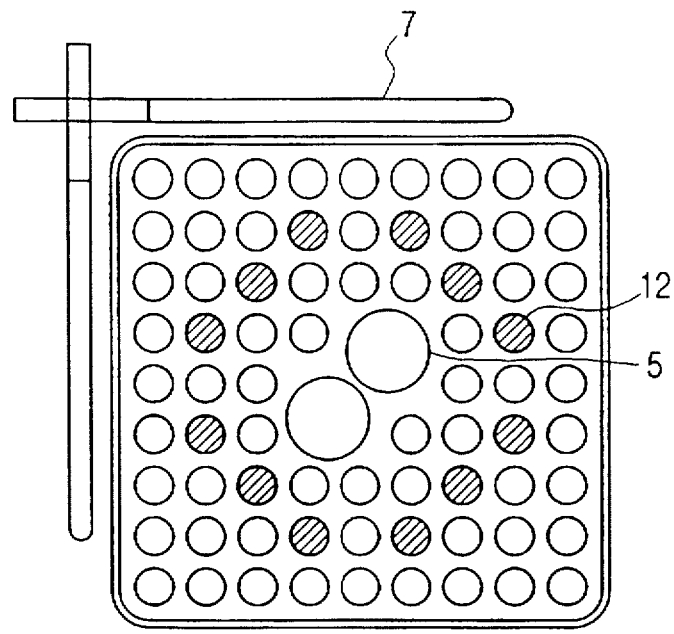
FIG. 11 is a lateral sectional view of a fuel assembly corresponding to a point A of FIG. 9.
Figure 12:
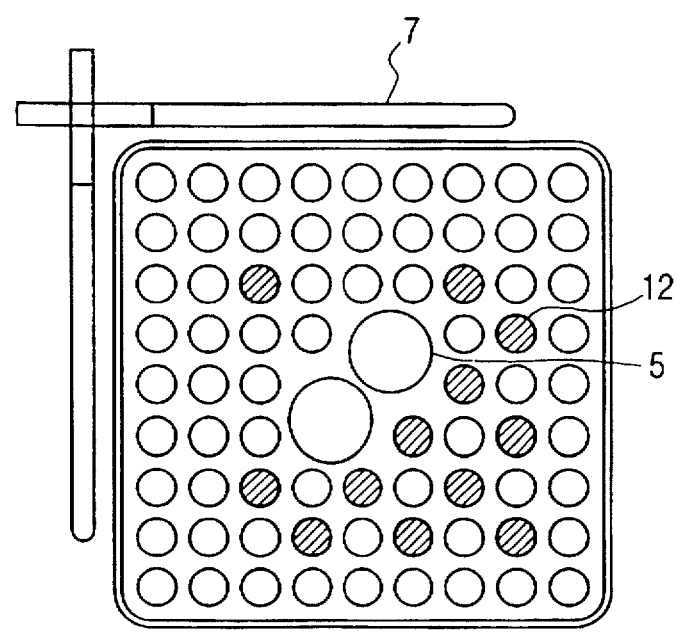
FIG. 12 is a lateral sectional view of a fuel assembly corresponding to a point B of FIG. 9.
Figure 13:
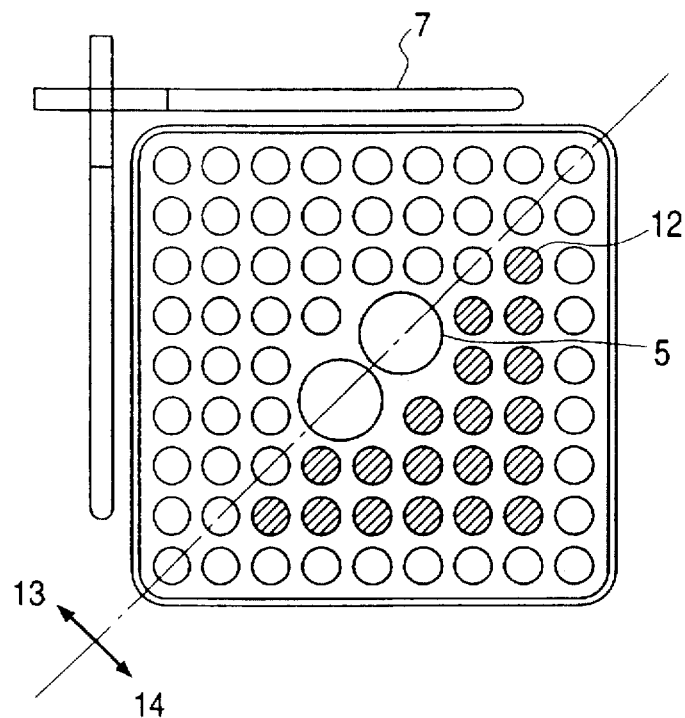
FIG. 13 is a diagram illustrating the upper limit in the difference of Gd rod number.
Figure 14:
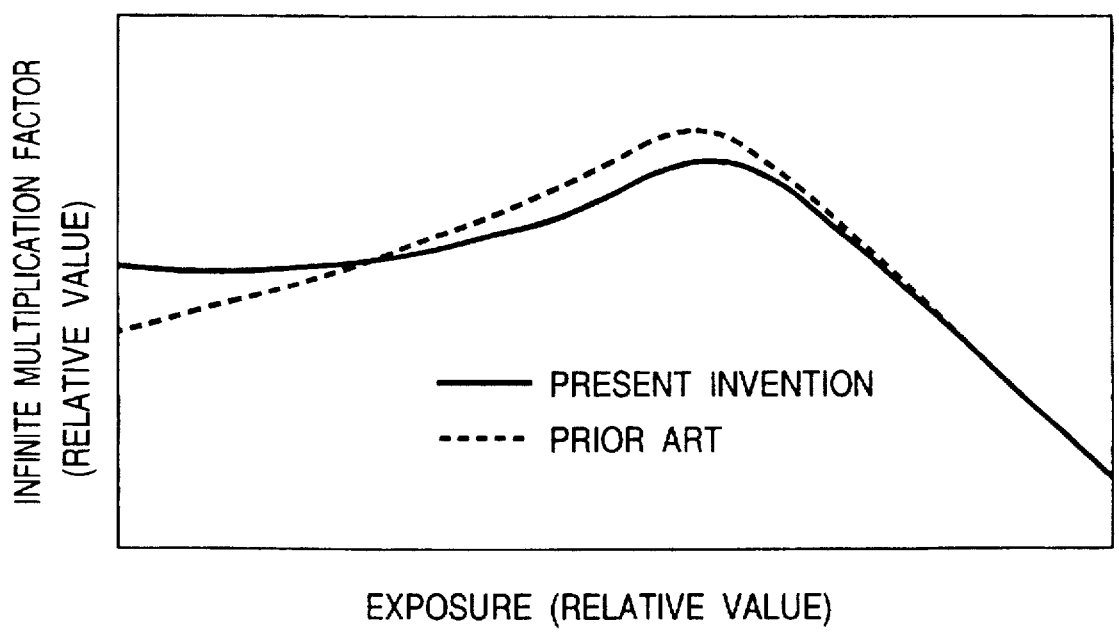
FIG. 14 is a diagram illustrating a change in the infinite multiplication factor depending upon the exposure according to the present invention.

Here, as described with reference to FIG. 7, the fuel rods in the high enrichment fuel 9 produce more power than the fuel rods in the high enrichment fuel 10 being affected by the flux of thermal neutrons from the low enrichment fuel 8. By setting the difference of Gd rod number in the high enrichment fuel 9 to be three which is larger than two as in this embodiment, therefore, it is allowed to flatten the fuel rod power, to increase the thermal margin, to suppress the excess reactivity and to improve fuel economy.

Figure 16:
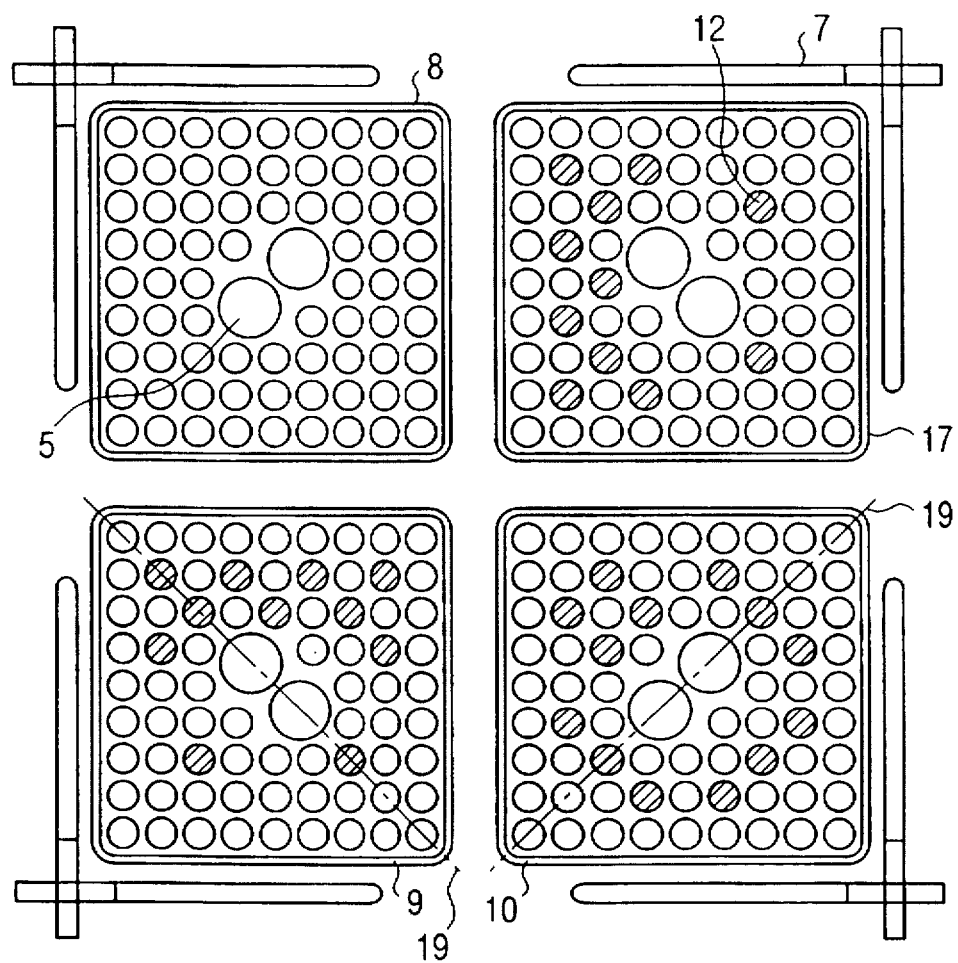
FIG. 16 is a lateral sectional view of a unit loading pattern according to a third embodiment of the present invention.

Next, described below with reference to FIG. 16 is the unit loading pattern according to a third embodiment of the present invention. FIG. 16 is a lateral sectional view of the third embodiment. There are eleven gadolinia rods 12 in the high enrichment fuel 9 that constitutes the unit loading pattern; i.e., three and a half gadolinia rods are arranged in the region of the side of the control rods and seven and a half gadolinia rods are arranged in the region of the side opposite to the control rods, the difference in the number of the rods being four. On the other hand, there are thirteen gadolinia rods 12 in the high enrichment fuel 10; i.e., six gadolinia rods are arranged in the region of the side of the control rods and seven gadolinia rods are arranged in the region of the side opposite to the control rods, the difference in the number of the rods being one. Even in this embodiment like the second embodiment of FIG. 15, it is allowed to flatten the fuel rod output, to increase the thermal margin, to suppress the excess reactivity and to improve fuel economy.

Figure 17:
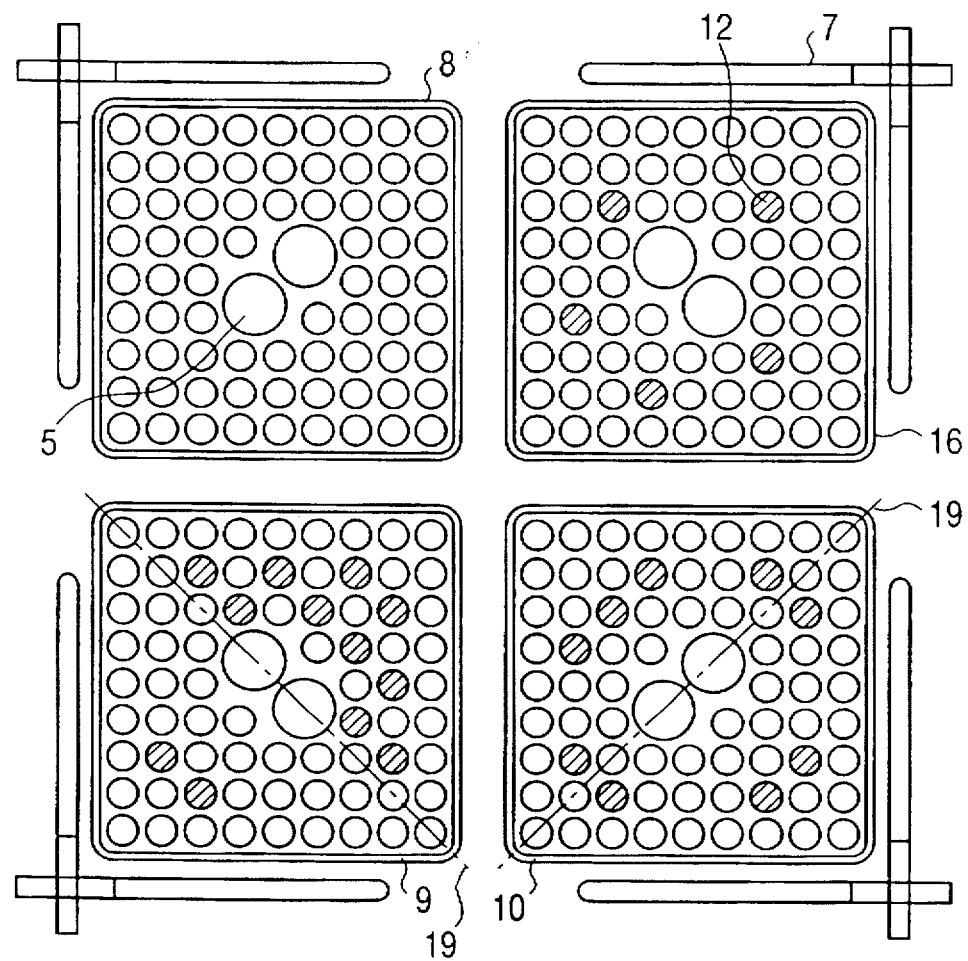
FIG. 17 is a lateral sectional view of a unit loading pattern according to a fourth embodiment of the present invention.

Next, described below with reference to FIG. 17 is a unit loading pattern according to a fourth embodiment of the present invention. FIG. 17 is a lateral sectional view of the fourth embodiment. This embodiment employs two high enrichment fuels 9 and 10 having gadolinia rods arranged in different ways, as well as a low enrichment fuel 8 and an intermediate enrichment fuel 16. The intermediate enrichment fuel 16 has an average enrichment factor which is lower than those of the high enrichment fuels 9 and 10 but is higher than that of the low enrichment fuel 8.

There are twelve gadolinia rods 12 in the high enrichment fuel 9; i.e., two gadolinia rods are arranged in the region of the side of the control rods and ten gadolinia rods are arranged in the region of the side opposite to the control rods, the difference in the number of the rods being eight. There are nine gadolinia rods 12 in the high enrichment fuel 10; i.e., four gadolinia rods are arranged in the region of the side of the control rods and five gadolinia rods are arranged in the region of the side opposite to the control rods, the difference in the number of the rods being one. There are five gadolinia rods 12 in the intermediate enrichment fuel 16; i.e., two gadolinia rods are arranged in the region of the side of the control rods and three gadolinia rods are arranged in the region of the side opposite to the control rods, the difference in the number of the rods being one.

Figure 18:
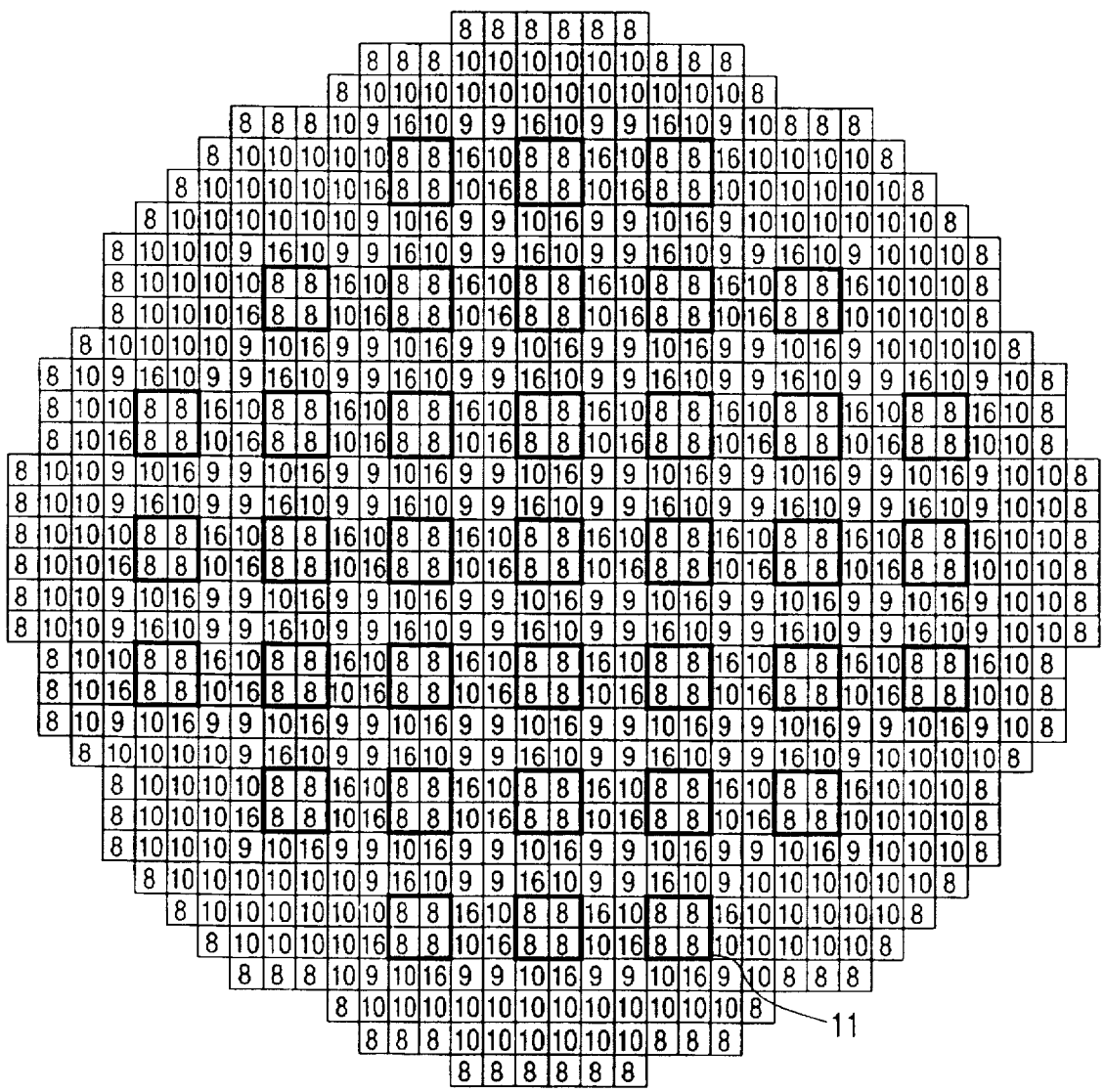
FIG. 18 is a lateral sectional view illustrating an initial core according to the second embodiment of the present invention.

Even in this embodiment like the second embodiment of FIG. 15, it is allowed to flatten the fuel rod output, to increase the thermal margin, to suppress the excess reactivity and to improve fuel economy. FIG. 18 is a lateral sectional view of the initial core of the second embodiment in which the high power region of the core is loaded with unit loading patterns of the fourth embodiment.

Figure 19:
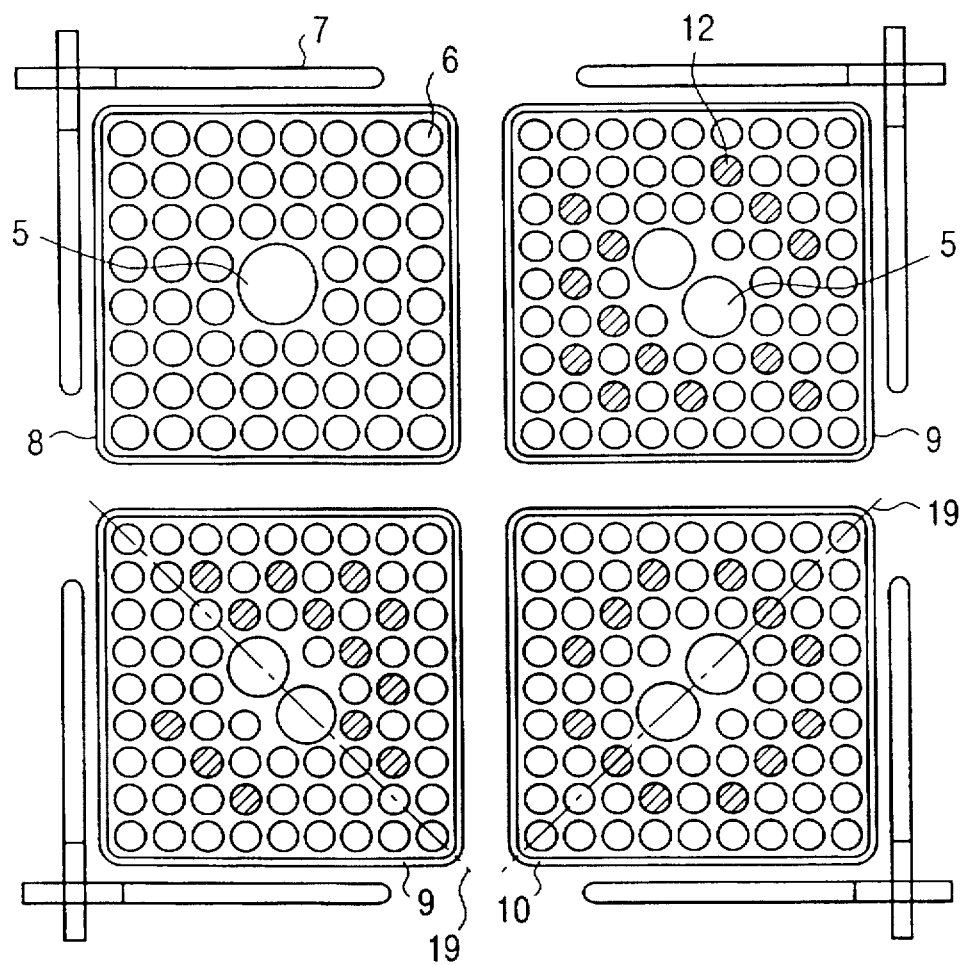
FIG. 19 is a lateral sectional view of a unit loading pattern according to a fifth embodiment of the present invention.

Next, described below with reference to FIG. 19 is the unit loading pattern according to a fifth embodiment of the present invention. FIG. 19 is a lateral sectional view of the fifth embodiment. Among the four fuel assemblies constituting the unit loading pattern of this embodiment, the three high enrichment fuels 9 and 10 are the same as those of the second embodiment of FIG. 15, but the low enrichment fuel 8 is different. The low enrichment fuel 8 according to this embodiment has fuel rods 6 arranged in a number of 8 þ 8 (8 rows, 8 columns) in a square lattice form, and has a water rod 5 arranged in a central region where four fuel rods can be arranged. There are thirteen gadolinia rods 12 in the high enrichment fuel 9 that constitutes the unit loading pattern; i.e., three gadolinia rods are arranged in the region of the side of the control rods and ten gadolinia rods are arranged in the region of the side opposite to the control rods, the difference in the number of the rods being seven. On the other hand, there are twelve gadolinia rods 12 in the high enrichment fuel 10; i.e., six gadolinia rods are arranged in the region of the side of the control rods and six gadolinia rods are arranged in the region of the side opposite to the control rods, the difference in the number of the rods being zero. Even when a unit loading pattern is constituted by using fuel assemblies having different shapes, it is allowed like the second embodiment of FIG. 15 to flatten the fuel rod output, to increase the thermal margin, to suppress the excess reactivity and to improve fuel economy.

Figure 20:
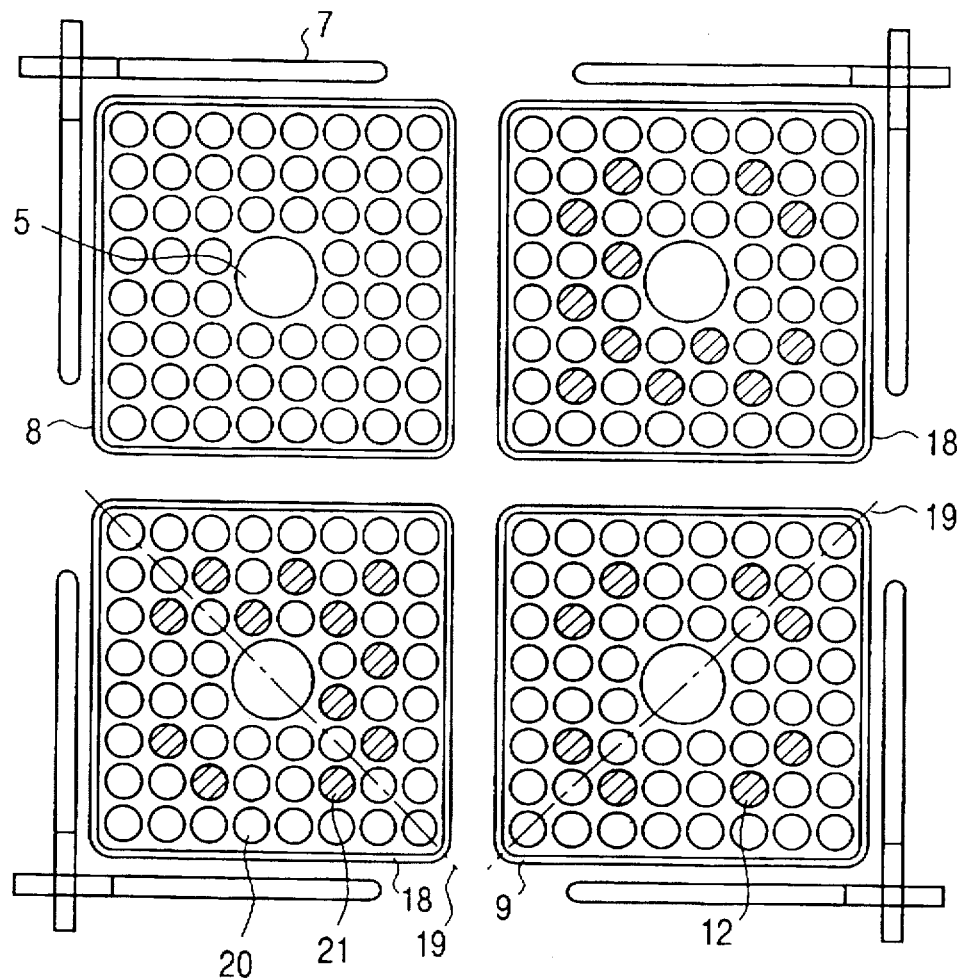
FIG. 20 is a lateral sectional view of a unit loading pattern according to a sixth embodiment of the present invention.

Next, described below with reference to FIG. 20 is a unit loading pattern according to a sixth embodiment of the present invention. FIG. 20 is a lateral sectional view of the sixth embodiment. The four fuel assemblies constituting the unit loading pattern of this embodiment all have the same shape as the low enrichment fuel 8 shown in FIG. 19.

In FIG. 20, the fuel assembly 18 is an MOX fuel that contains plutonium when it is loaded in the core. The fuel assembly 18 includes rods 20 without containing gadolinia, and gadolinia rods 21 containing gadolinia. At least some of the fuel rods 20 contain plutonium. The gadolinia rods 21 contain gadolinia, and at least some of them contain plutonium. The gadolinia rods 21 may not contain plutonium, as a matter of course.

There are twelve gadolinia rods 21 in the fuel assembly 18; i.e., four gadolinia rods are arranged in the region of the side of the control rods and eight gadolinia rods are arranged in the region of the side opposite to the control rod, the difference in the number of the rods being four. Furthermore, there are eight gadolinia rods 12 in the high enrichment fuel 9; i.e., four gadolinia rods are arranged in the region of the side of the control rods and four gadolinia rods are arranged in the region of the side opposite to the control rods, the difference in the number of the rods being zero. Even when the fuel assemblies have different shapes as in this embodiment, the difference of Gd rod number in the fuel assembly 18 is set to be four which is larger than two, making it possible to flatten the fuel rod output, to increase the thermal margin, to suppress the excess reactivity and to improve fuel economy.

In this embodiment, the two fuel assemblies 18 containing plutonium and the low enrichment fuel 8 and high enrichment fuel 9 which are fuel assemblies without containing plutonium are arranged along the diagonal line. Here, however, the high enrichment fuel 9 may be replaced by, for example, the fuel assembly 18.

Figure 21:
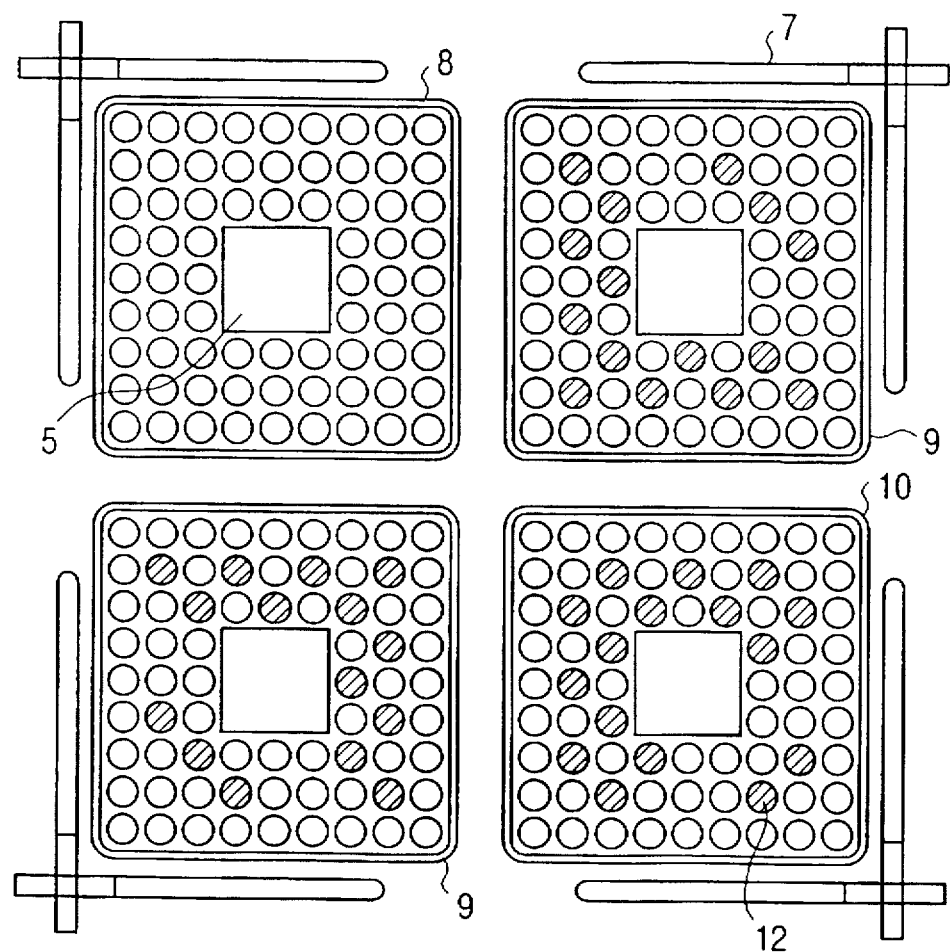
FIG. 21 is a lateral sectional view of a unit loading pattern according to a seventh embodiment of the present invention.
Figure 22:
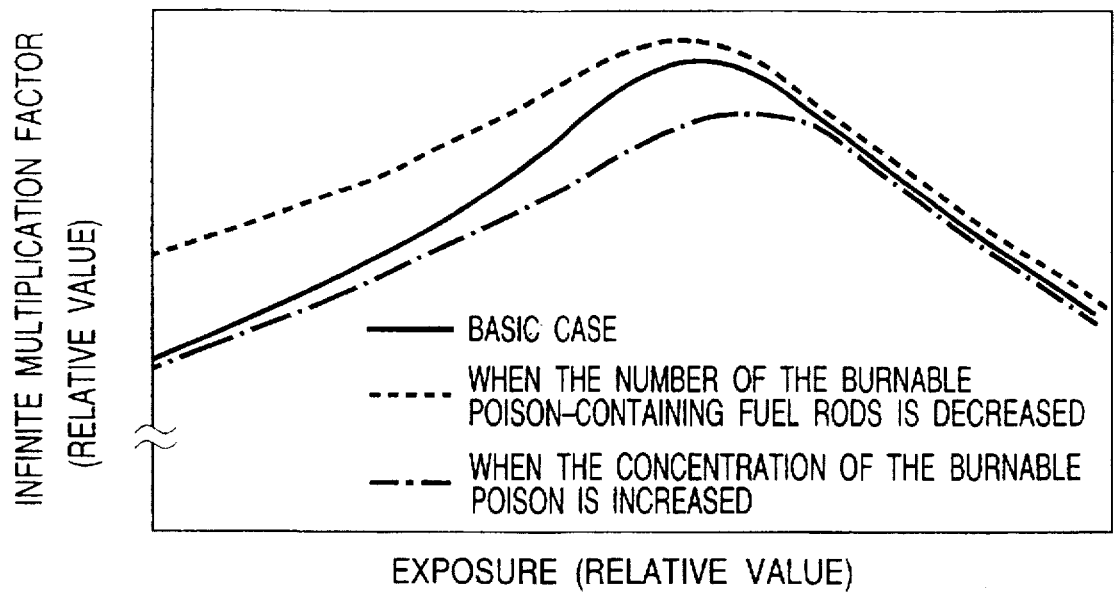
FIG. 22 is a diagram illustrating the effect for suppressing the reactivity of a burnable poison.
Figure 23:
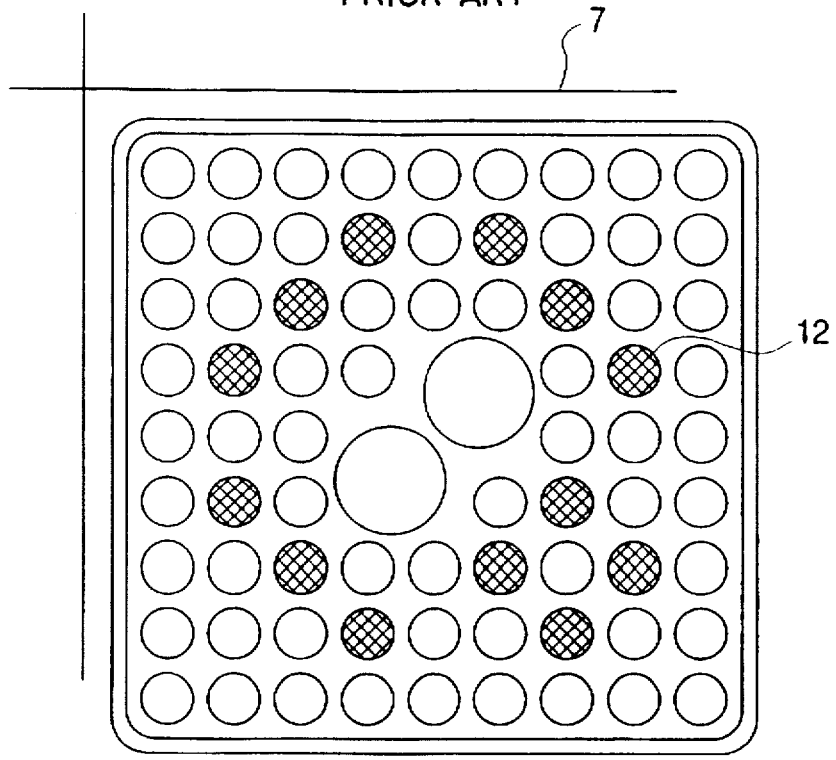
FIG. 23 is a diagram illustrating the arrangement of the gadolinia rods in the fuel assembly according to a prior art.

Described below next with reference to FIG. 21 is the unit loading pattern according to a seventh embodiment of the present invention. FIG. 21 is a lateral sectional view of the seventh embodiment. The four fuel assemblies constituting the unit loading pattern of this embodiment has the fuel rods in a number of 9 þ 9 arranged in a square lattice form and has a water box 15 arranged at the central portion thereof like in the first embodiment of FIG. 2. The water box 15 occupies a region where nine fuel rods can be arranged, and the number of the fuel rods in the fuel assembly is 72.

There are fifteen gadolinia rods 12 in the fuel assembly 9 of this embodiment; i.e., five gadolinia rods are arranged in the region of the side of the control rods and ten gadolinia rods are arranged in the region of the side opposite to the control rod, the difference in the number of the rods being five. Furthermore, there are sixteen gadolinia rods 12 in the high enrichment fuel 10; i.e., six gadolinia rods are arranged in the region of the side of the control rods and ten gadolinia rods are arranged in the region of the side opposite to the control rods, the difference in the number of the rods being four. Even in this embodiment, the difference of Gd rod number in the fuel assembly is set to be four or more, making it possible to flatten the fuel rod output, to increase the thermal margin, to suppress the excess reactivity and to improve fuel economy like in the first embodiment of FIG. 2.

We claim:

1. An initial core comprising a plurality of fuel assemblies having a substantially square outer shape and different average enrichment factors, and a plurality of cross-shaped control rods, characterized in that a low enrichment fuel assembly having the lowest average enrichment factor and three fuel assemblies having a higher average enrichment factor than that of the low enrichment fuel assembly are arranged in a square shape, said control rods are arranged at each of four corners of said square shape to constitute a unit loading pattern, a plurality of said unit loading patterns are provided in the central region of the core, at least two of the fuel assemblies having the higher average enrichment factor are divided by a diagonal line into a first region of the side of the control rods and a second region of the side opposite to the control rods, and the number of gadolinia-containing fuel rods is greater in the second region by at least two than in the first region.

2. An initial core according to claim 1, wherein said plurality of unit loading patterns are so arranged that the low enrichment fuel assemblies of the four unit loading patterns are adjacent to each other to constitute a control cell of a square shape.

3. An initial core according to claim 1 or 2, wherein the number of the gadolinia-containing fuel rods is greater in the second region by 3 to 19 than in the first region.

4. An initial core according to claim 3, wherein each of said fuel assemblies has fuel rods arranged in the form of a lattice of 9 rows and 9 columns, and has two water rods of a large diameter arranged in a region where seven fuel rods can be arranged at the center of the fuel assembly.

5. An initial core according to claim 3, wherein each of said fuel assemblies has fuel rods arranged in the form of a lattice of 9 rows and 9 columns, and has a water box arranged in a region where nine fuel rods can be arranged at the center of the fuel assembly.

6. An initial core comprising a plurality of fuel assemblies containing plutonium and a plurality of fuel assemblies without containing plutonium. said fuel assembles having a substantially square outer shape. and a plurality of cross-shaped control rods. characterized in that two fuel assemblies containing plutonium and two fuel assemblies without containing plutonium are arranged in a square shape. the two fuel assemblies containing plutonium are adjacent diagonally. said control rods are arranged at each of four corners of said square shape to constitute a unit loading pattern. a plurality of said unit loading patterns are provided in the central region of the core, the fuel assemblies containing plutonium are divided by a diagonal line into a first region of the side of the control rods and a second region of the side opposite to the control rods, and the number of the gadolinia-containing fuel rods is greater in the second region by at least two than in the first region.

7. A fuel assembly comprising a plurality of fuel rods arranged in the form of a square lattice, an upper tie plate and a lower tie plate for supporting said plurality of fuel rods at upper and lower portions, and a channel fastener attached to a corner portion of the upper tie plate. characterized in that the fuel assembly is divided by a diagonal line into a first region of the side of the channel fastener and a second region of the side opposite to the channel fastener, and the number of gadolinia-containing fuel rods is greater in the second region by at least two than in the first region.

8. A fuel assembly according to claim 7, wherein the number of the gadolinia-containing fuel rods is greater in the second region by 3 to 19 than in the first region.

9. A fuel assembly according to claim 7 or 8. wherein said fuel rods are arranged in the form of a lattice of 9 rows and 9 columns, and two water rods of a large diameter are arranged in a region where seven fuel rods can be arranged at the center of the fuel assembly.

10. A fuel assembly according to claim 7 or 8, wherein said fuel rods are arranged in the form of a lattice of 9 rows and 9 columns, and a water box is arranged in a region where nine fuel rods can be arranged at the center of the fuel assembly.

11. An initial core comprising a plurality of fuel assemblies having different average enrichment factors, and a plurality of cross-shaped control rods, wherein a cell of the initial core is formed by arranging one low enriched fuel assembly and three high enriched fuel assemblies having a higher average enrichment factor than that of the low enriched fuel assembly in a square shape. a plurality of unit loading patterns are provided in a central region of the initial core, each of the unit loading patterns is formed by arranging the control rods at each of four corners of the cell. at least two of the high-enriched fuel assemblies include gadolinia-containing fuel rods, and a greater number of the gadolinia-containing fuel rods of the at least two high-enriched fuel assemblies of the cell is arranged in a region of the at least two of the high-enriched fuel assemblies closer to the low enriched fuel assembly than in a region of the at least two high enriched fuel assemblies which is farther away from the low-enriched fuel assembly.

* * * * *